United States Patent
Ankaiah et al.

(10) Patent No.: US 9,264,974 B2
(45) Date of Patent: Feb. 16, 2016

(54) MOBILITY INTEGRATION WITH FABRIC ENABLED NETWORK

(71) Applicant: Avaya Inc., Basking Ridge, NJ (US)

(72) Inventors: Shashi Hosakere Ankaiah, Bangalore (IN); Vivek L Atreya, Bangalore (IN); Deepak Ramesh, Bangalore (IN); Prasad Vadassery, Bangalore (IN); Shyam Natarajan, Bangalore (IN); Uday Shankar, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 109 days.

(21) Appl. No.: 14/048,023

(22) Filed: Oct. 7, 2013

(65) Prior Publication Data

US 2015/0098443 A1    Apr. 9, 2015

(51) Int. Cl.
*H04W 4/00* (2009.01)
*H04W 40/36* (2009.01)
*H04W 8/14* (2009.01)
*H04L 12/46* (2006.01)

(52) U.S. Cl.
CPC ........... *H04W 40/36* (2013.01); *H04L 12/4633* (2013.01); *H04W 8/14* (2013.01)

(58) Field of Classification Search
None
See application file for complete search history.

(56) References Cited

U.S. PATENT DOCUMENTS

| 2009/0310535 | A1 | 12/2009 | Anumala et al. | |
| 2010/0290398 | A1* | 11/2010 | Choudhary et al. | 370/328 |
| 2011/0274082 | A1* | 11/2011 | Calhoun et al. | 370/331 |

FOREIGN PATENT DOCUMENTS

| EP | 2252096 | * | 11/2010 |
| EP | 2252096 | A1 | 11/2010 |
| GB | 2451738 | A1 | 2/2009 |

OTHER PUBLICATIONS

International Search Report and Written Opinion dated Feb. 5, 2015 for PCT/US2014/059524

* cited by examiner

*Primary Examiner* — Frank Duong

(57) ABSTRACT

Systems, methods and computer readable media for mobility integration with fabric-enabled networks are described. Some implementations can include a method comprising terminating, using one or more processors, an access tunnel at an edge switch of a fabric-enabled network, and establishing, using the one or more processors, a mobility tunnel with the edge switch. The method can also include mapping, using the one or more processors, a mobility network to a service identifier associated with the mobility network. The method can further include forwarding, using the one or more processors, traffic for the mobility network from the edge switch to another edge switch across the fabric enabled network, wherein the traffic includes the service identifier.

12 Claims, 5 Drawing Sheets

MOBILITY INTEGRATION WITH FABRIC ENABLED NETWORK

FIELD

Embodiments relate generally to computer networks and more particularly to mobility integration with fabric enabled networks.

BACKGROUND

In some current mobility deployments within fabric based networks such as shortest path bridging networks with MAC and MAC encapsulation access points terminate access tunnels on wireless switching plane. The wireless switching plane attaches to a fabric enabled network and establishes a mobility tunnel with peer wireless switching planes over the fabric enabled network.

Wireless switching planes advertise services to peer wireless switching planes over mobility tunnels. Mobility tunnels provide seamless mobility by extending the client networks with the help of a signaling plane. Within the wireless switching planes, client traffic is encapsulated using a header and the fabric network may apply policies to the encapsulated frame. Mobility services offered using the fabric enabled network may include transport only (e.g., establishing mobility tunnels over an SPBM network).

A need may exist for a signaling plane to extend a client network whenever a client roams. A fabric enabled network may need to apply policies to encapsulated tunnel frames. When traffic is roaming across the network, it may be required to traverse one extra hop through a VLAN server to reach the roaming client. Also, traffic disruption may occur during the VLAN server fail over as the signaling plane has to reelect a VLAN server and reprogram the new VLAN server in the data path.

Embodiments were conceived in light of the above-mentioned problems and limitations, among other things.

SUMMARY

Some implementations can include a method comprising terminating, using one or more processors, an access tunnel at an edge switch of a fabric-enabled network, and establishing, using the one or more processors, a mobility tunnel with the edge switch. The method can also include mapping, using the one or more processors, a mobility network to a service identifier associated with the mobility network. The method can further include forwarding, using the one or more processors, traffic for the mobility network from the edge switch to another edge switch across the fabric enabled network, wherein the traffic includes the service identifier.

The fabric-enabled network can include an SPBm network. The edge switch can include a backbone edge bridge. The mobility tunnel can be established between a wireless switching plane component and the edge switch. The mobility network can be a mobility VLAN. The service identifier can include an ISID.

The method can also include determining that a client device is roaming to a different access point. The method can further include dynamically binding the mobility network to a service identifier at a wireless switching plane component associated with the different access point.

Some implementations can include a system comprising one or more processors configured to perform operations. The operations can include terminating, using one or more processors, an access tunnel at an edge switch of a fabric-enabled network, and establishing, using the one or more processors, a mobility tunnel with the edge switch. The operations can also include interconnecting, using the one or more processors, the mobility tunnel on the edge switch with another mobility tunnel associated with a wireless switching plane component. The operations can further include mapping, using the one or more processors, a mobility network to a service identifier associated with the mobility network. The operations can also include exchanging, using the one or more processors, traffic from the mobility tunnel associated with the edge switch with traffic from the other mobility tunnel associated with the wireless switching plane component.

The fabric-enabled network can include an SPBm network. The edge switch can include a backbone edge bridge. The other mobility tunnel can be established between a wireless switching plane component and a non-fabric enabled network.

The mobility network can be a mobility VLAN. The service identifier can be an ISID. The operations can also include determining that a client device is roaming to a different access point. The operations can further include dynamically binding the mobility network to a service identifier at a wireless switching plane component associated with the different access point.

Some implementations can include a nontransitory computer readable medium having stored thereon software instructions that, when executed by a processor, cause the processor to perform operations. The operations can include terminating, using one or more processors, an access tunnel at an edge switch of a fabric-enabled network. The operations can also include establishing, using the one or more processors, a mobility tunnel with the edge switch. The operations can further include mapping, using the one or more processors, a mobility network to a service identifier associated with the mobility network. The operations can also include forwarding, using the one or more processors, traffic for the mobility network from the edge switch to another edge switch across the fabric enabled network, wherein the traffic includes the service identifier.

The fabric-enabled network can include an SPBm network. The edge switch can include a backbone edge bridge. The mobility tunnel can be established between a wireless switching plane component and the edge switch. The mobility network can be a mobility VLAN. The service identifier can include an ISID.

The operations can also include determining that a client device is roaming to a different access point. The method can further include dynamically binding the mobility network to a service identifier at a wireless switching plane component associated with the different access point.

DETAILED DESCRIPTION

Figure 1:
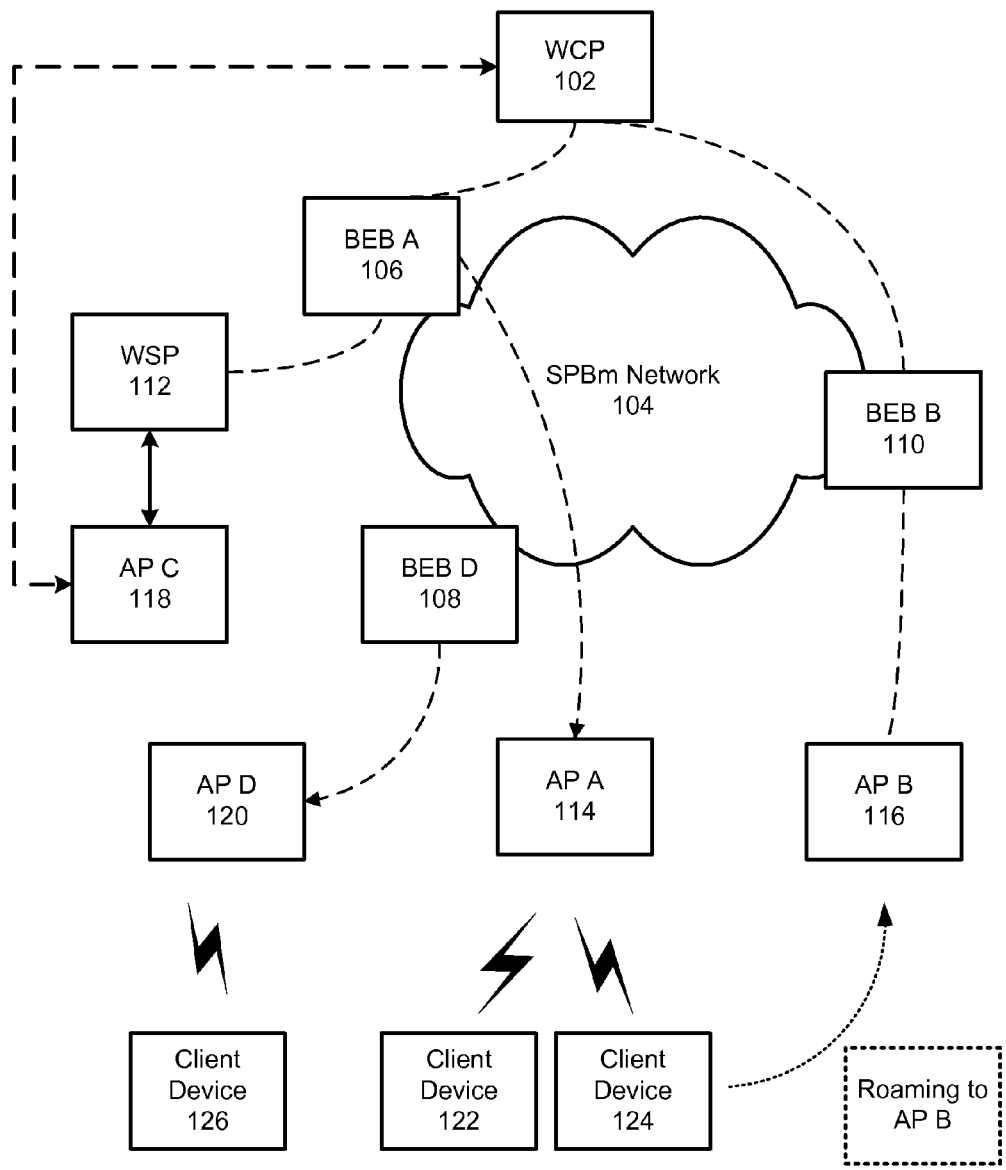
FIG. 1 is a diagram of an example system for mobility integration with fabric enabled networks in accordance with at least one embodiment.

FIG. 1 shows a diagram of an example network 100 including a wireless control plane 102, an SPBM network 104, a first backbone edge bridge (BEB) 106, a second backbone edge bridge 108, and a third backbone edge bridge 110. The network 100 also includes a wireless switching plane 112, a first access point 114, a second access point 116, a third access point 118, a fourth access point 120, a first client 122, a second client 124, and a third client 126.

In operation, the second client 124 may be accessing the network via access point 114 but may be roaming and need to access the network via access point 116. Access point 114 terminates an access tunnel from backbone edge bridge 106 and access point 116 terminates an access tunnel on backbone edge bridge 110.

Wireless switching plane 118 terminates mobility tunnel with a backbone edge bridge 106 and access point 118 terminates an access tunnel on the wireless switching plane 112. The backbone edge bridges 106 to 110 and the wireless switching plane 112 can download mobility VLANs (e.g. "employee", "HR" and "finance") from the wireless control plane. The backbone edge bridge 106 and the backbone edge bridge 108 can provide service for the "employee" VLAN. The backbone edge bridge 110 can provide service for the "HR" VLAN, and the wireless switching plane 112 can provide service for the "finance" VLAN. The backbone edge bridge 106 and the backbone edge bridge 108 can map the MVLAN "employee" to ISID 10, while the backbone edge bridge 110 can map the MVLAN "HR" to ISID 20.

The client 122 and the client 124 can associate with access point 114 and can be assigned to mobility VLAN "employee". Access point 114 and backbone edge bridge 106 can program the access tunnel "employee".

In this example, the client 124 is roaming from access point 114 to access point 116. The access point 116 requests the backbone edge bridge 110 to provide service in the MVLAN "employee". The backbone edge bridge 110 creates a dynamic binding between the MVLAN "employee" and ISID 10. The backbone edge bridge 110 sends a triggered update of the dynamic binding to other peer BEBs. The peer BEBs record the information for the dynamic binding.

The backbone edge bridge 110 broadcasts GARPs on behalf of the client, on ISID 10 which is mapped to MVLAN "employee". The backbone edge bridge 106 and the backbone edge bridge 108 record the MAC movement. The backbone edge bridge 110 bridges the traffic destined to the client 122 to backbone edge bridge 108 over the SPBM network 104.

The BEBs can delete the dynamic binding in response to a detected condition, such as inactivity from the roaming client. The fabric enabled network (e.g., SPBm network) can apply policies to the client traffic.

Figure 2:
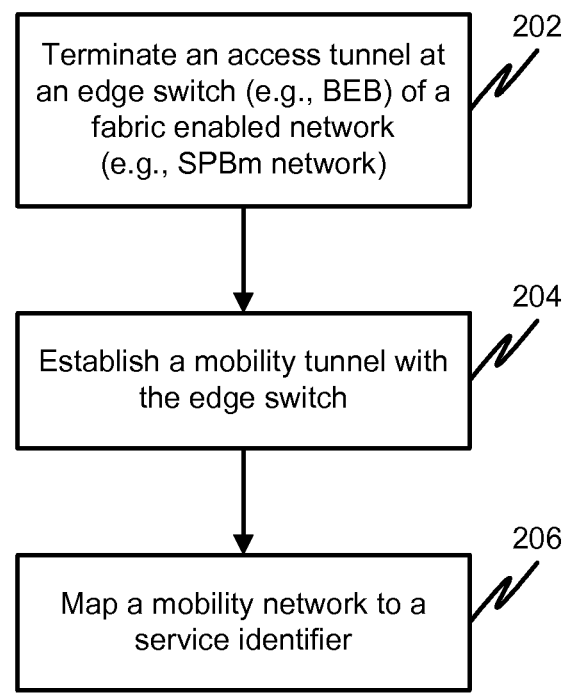
FIG. 2 is a flowchart of an example method for mobility integration with fabric enabled networks in accordance with at least one embodiment.

FIG. 2 shows an example flowchart method for mobility integration with a fabric enabled network. Processing begins at 202, where an access tunnel is terminated at an edge which of a network. For example, an access tunnel can be terminated at a backbone edge bridge of a SPBM network. The access tunnel connecting an access point with the backbone edge bridge. Processing continues to 204.

At 204, a mobility tunnel is established with the edge switch. The mobility tunnel can connect a wireless switching plane with the edge switch, for example, a BEB. Processing continues to 206.

At 206, a mobility network is mapped to a service identifier. For example, a MVLAN can be mapped to an ISID. Once the mapping is done, traffic for the mobility network can be forwarded from one edge switch (e.g., BEB) to another edge switch across the fabric enabled network using the service identifier, which can be included in the traffic.

It will be appreciated that steps 202 through 206 can be repeated in whole or in part in order to accomplish a contemplated mobility integration task.

Figure 3:
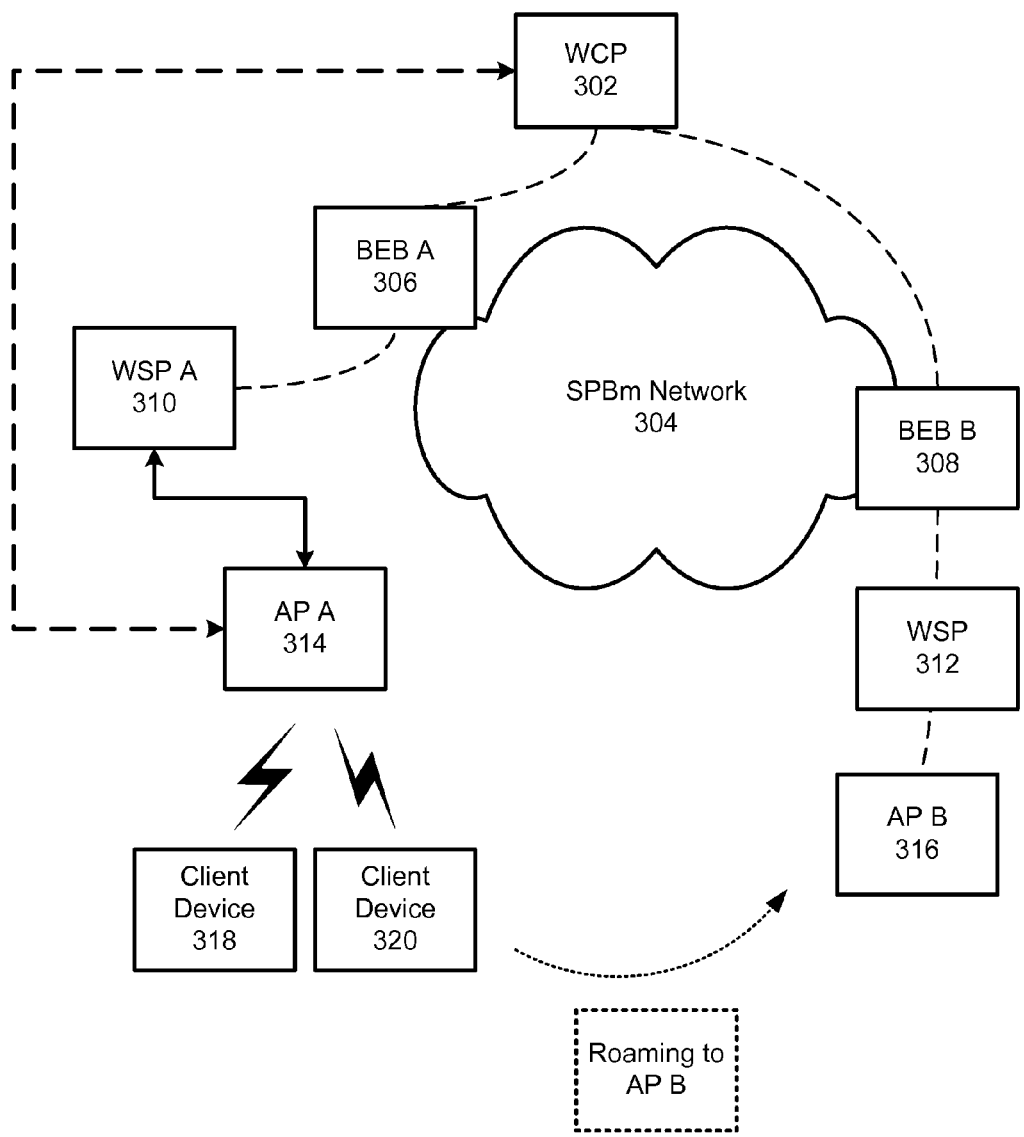
FIG. 3 is a diagram of an example system for mobility integration with fabric enabled networks in accordance with at least one embodiment.

FIG. 3 shows a diagram of an example network for internet working of fabric capable WSPs and/or BEBs with non-fabric capable WSPs. In particular, the network 300 includes a wireless control plane 302, a fabric network 304, a first backbone edge bridge 306, a second backbone edge bridge 308, a first wireless switching plane 310, a second wireless switching plane 312, a first access point 314, a second access point 316, a first client 318 and a second client 320.

In operation, the access point 314 terminates an access tunnel on the wireless switching plane 310 and the access point 316 terminates an access tunnel on the wireless switching plane 312. Wireless switching plane 310 terminates a mobility tunnel with backbone edge bridge 306 and wireless switching plane 312 terminates a mobility tunnel with backbone edge bridge 308.

The backbone edge bridges and the wireless switching planes download the mobility VLAN "employee", "HR" and "finance" from the wireless control plane 302. The backbone edge bridge 306 provides service for the "employee" MVLAN, the backbone edge bridge 308 provides service for the "HR" MVLAN, and the wireless switching plane 310 and wireless switching plane 312 provides service for the "finance" MVLAN.

The backbone edge bridge 306 maps the MVLAN "employee" to ISID 10, the backbone edge bridge 308 maps the MVLAN "HR" to ISID 20.

The client 318 and the client 320 associates with access point 314 and are assigned to the mobility VLAN "finance". The access point 314 and the wireless switching plane 310 program an access tunnel in the "finance" MVLAN.

The client 320 is roaming to access point 316. Access point 316 requests wireless switching plane 312 to provide service in the MVLAN "finance". The wireless switching plane 312 in turn requests the backbone edge bridge 308 for service in the MVLAN "finance". The backbone edge bridge 308 creates a dynamic binding between MVLAN "finance" and ISID 10 (from reserve range). The backbone edge bridge 308 sends a triggered update of the dynamic binding to the peer backbone edge bridges. The peer backbone edge bridges terminating the mobility tunnel will create a dynamic binding between the MVLAN finance and the ISID 1000.

The backbone edge bridge 308 broadcasts GARPs messages on behalf of the client on ISID 1000 which is mapped to MVLAN "finance". Traffic flows from client 320 to client 318 in the following path: client 320 to access point 316, to wireless switching plane 312, to backbone edge bridge 308, to backbone edge bridge 306, to wireless service 310, to access point 314, and finally to client 318.

Figure 4:
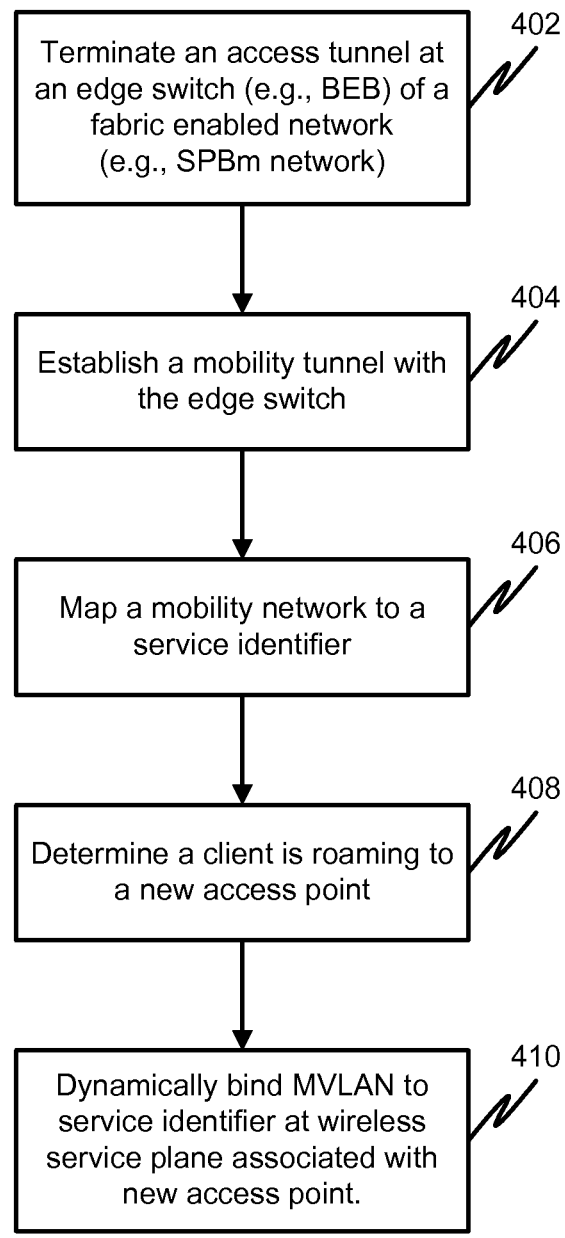
FIG. 4 is a flowchart of an example method for mobility integration with fabric enabled networks in accordance with at least one embodiment.

FIG. 4 shows a flowchart of an example method for internet working of fabric capable and non-fabric capable WSPs. Processing begins at 402 where an access tunnel is terminated at an edge switch of a network. Processing continues to 404.

At 404, the mobility tunnel is established between a wireless switching plane and an edge switch. Processing continues to 406.

At 406, the mobility network is mapped to a service identifier. Processing continues to 408.

At 408, the system determines if a client is roaming to a new access point. Processing continues to 410.

At 410, a backbone edge bridge associated with the new access point dynamically binds an MVLAN to a service identifier at the wireless switching plane associated with the new access point.

It will be appreciated that steps 402 to 410 can be repeated in whole or in part in order to accomplish a contemplated internet working task.

Figure 5:
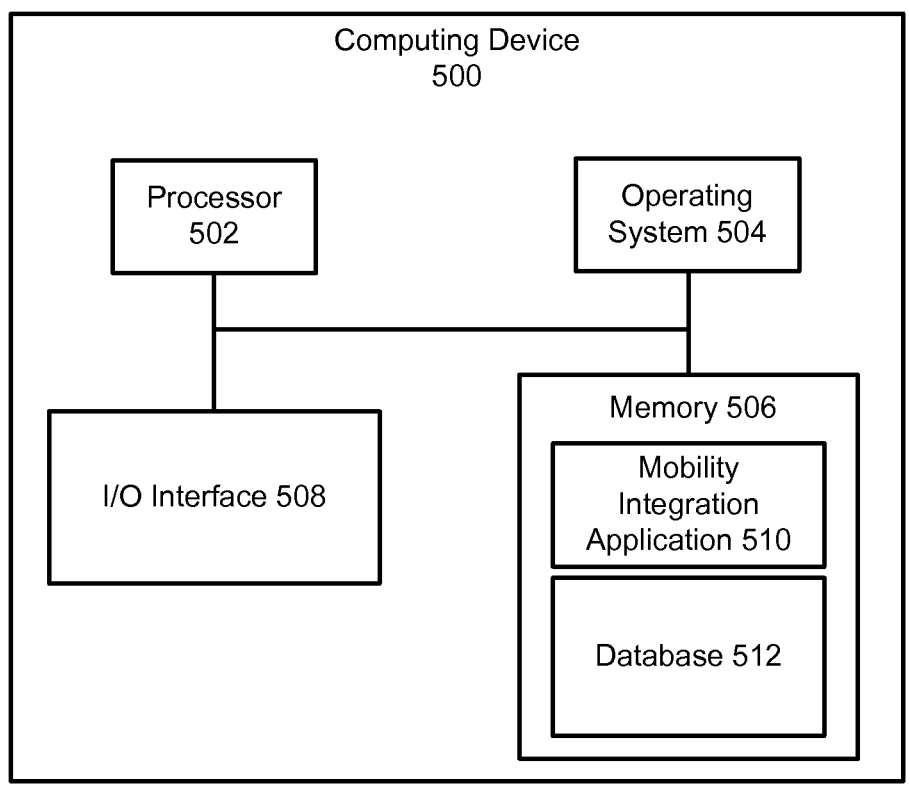
FIG. 5 is a diagram of an example computer system for mobility integration with fabric enabled networks in accordance with at least one embodiment.

FIG. 5 is a diagram of an example computer system 500 in accordance with at least one implementation. The computer 500 includes a processor 502, operating system 504, memory 506 and I/O interface 508. The memory 506 can include a mobility integration application 510 and a database 512.

In operation, the processor 502 may execute the application 410 stored in the memory 506. The application 510 can include software instructions that, when executed by the processor, cause the processor to perform operations for mobility integration in accordance with the present disclosure (e.g., performing one or more of steps 202-206 and/or 402-410).

The application program 510 can operate in conjunction with the database 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for mobility integration with fabric enabled networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:
1. A method comprising:
  terminating, using one or more processors, an access tunnel at an edge switch of a fabric-enabled network, wherein the fabric enabled network includes a shortest path bridging mac-in-mac encapsulation (SPBm) network;

establishing, using the one or more processors, a mobility tunnel with the edge switch;

mapping, using the one or more processors, a mobility VLAN network to a service instance identifier (ISID) of the SPBm network so as to associate the ISID with the mobility VLAN network; and forwarding, using the one or more processors, traffic for the mobility VLAN network from the edge switch to another edge switch across the fabric enabled network according to an ISID value within the traffic.

2. The method of claim 1, wherein the edge switch includes a backbone edge bridge.

3. The method of claim 1, wherein the mobility tunnel is established between a wireless switching plane component and the edge switch.

4. The method of claim 1, further comprising:

determining that a client device is roaming to a different access point; and dynamically binding the mobility VLAN network to a service instance identifier (ISID) at a wireless switching plane component associated with the different access point.

5. A system comprising one or more processors configured to perform operations including:

terminating, using one or more processors, an access tunnel at an edge switch of a fabric-enabled network, wherein the fabric enabled network includes a shortest path bridging mac-in-mac encapsulation (SPBm) network;

establishing, using the one or more processors, a mobility tunnel with the edge switch;

interconnecting, using the one or more processors, the mobility tunnel on the edge switch with another mobility tunnel associated with a wireless switching plane component;

mapping, using the one or more processors, a mobility VLAN network to a service instance identifier (ISID) of the SPBm network so as to associate the ISID with the mobility VLAN network; and exchanging, using the one or more processors, traffic from the mobility tunnel associated with the edge switch with traffic from the other mobility tunnel associated with the wireless switching plane component according to an ISID value within the traffic.

6. The system of claim 5, wherein the edge switch includes a backbone edge bridge.

7. The system of claim 5, wherein the other mobility tunnel is established between a wireless switching plane component and a non-fabric enabled network.

8. The system of claim 5, further comprising:

determining that a client device is roaming to a different access point; and dynamically binding the mobility VLAN network to a service instance identifier (ISID) at a wireless switching plane component associated with the different access point.

9. A nontransitory computer readable medium having stored thereon software instructions that, when executed by a processor, cause the processor to perform operations including:

terminating, using one or more processors, an access tunnel at an edge switch of a fabric-enabled network, wherein the fabric enabled network includes a shortest path bridging mac-in-mac encapsulation (SPBm) network;

establishing, using the one or more processors, a mobility tunnel with the edge switch;

mapping, using the one or more processors, a mobility VLAN network to a service instance identifier (ISID) of the SPBm network so as to associate the ISID with the mobility VLAN network; and forwarding, using the one or more processors, traffic for the mobility VLAN network from the edge switch to another edge switch across the fabric enabled network, wherein the traffic includes the ISID associated with the mobility VLAN.

10. The nontransitory computer readable medium of claim 9, wherein the edge switch includes a backbone edge bridge.

11. The nontransitory computer readable medium of claim 9, wherein the mobility tunnel is established between a wireless switching plane component and the edge switch.

12. The nontransitory computer readable medium of claim 9, further comprising:

determining that a client device is roaming to a different access point; and dynamically binding the mobility VLAN network to a service instance identifier (ISID) at a wireless switching plane component associated with the different access point.

* * * * *